US007330611B2

(12) United States Patent
Bull et al.

(10) Patent No.: US 7,330,611 B2
(45) Date of Patent: Feb. 12, 2008

(54) METHOD AND APPARATUS FOR ENHANCING THE EXTINCTION RATIO IN MODE CONVERTERS

(75) Inventors: Jeffrey D. Bull, Vancouver (CA); Adam Robert Reid, Vancouver (CA); Nicolas August Fleming Jaeger, Vancouver (CA)

(73) Assignee: Versawave Technologies Inc., Burnaby, British Columbia (CA)

( * ) Notice: Subject to any disclaimer, the term of this patent is extended or adjusted under 35 U.S.C. 154(b) by 136 days.

(21) Appl. No.: 10/951,611

(22) Filed: Sep. 29, 2004

(65) Prior Publication Data
US 2006/0067604 A1    Mar. 30, 2006

(51) Int. Cl.
*G02B 6/00* (2006.01)
(52) U.S. Cl. .......................................... 385/11
(58) Field of Classification Search .................. None
See application file for complete search history.

(56) References Cited

U.S. PATENT DOCUMENTS

| | | | | |
|---|---|---|---|---|
| 4,958,918 A | * | 9/1990 | Walker | 359/249 |
| 5,373,385 A | * | 12/1994 | Darcie et al. | 398/187 |
| 6,404,537 B1 | * | 6/2002 | Melman et al. | 359/323 |
| 6,459,826 B1 | * | 10/2002 | Boivin et al. | 385/11 |
| 6,493,473 B1 | * | 12/2002 | Wooten | 385/11 |
| 6,576,886 B1 | * | 6/2003 | Yao | 250/225 |
| 7,024,058 B2 | * | 4/2006 | Han et al. | 385/11 |
| 7,067,795 B1 | * | 6/2006 | Yan et al. | 250/225 |
| 2002/0015547 A1 | * | 2/2002 | Patel | 385/11 |
| 2004/0051820 A1 | * | 3/2004 | Yuan et al. | 349/33 |
| 2006/0268392 A1 | * | 11/2006 | Setti et al. | 359/337.5 |

* cited by examiner

*Primary Examiner*—Michelle Connelly-Cushwa
*Assistant Examiner*—Chris Chu
(74) *Attorney, Agent, or Firm*—Jeffrey M. Measures; Borden Ladner Gervais LLP (57) ABSTRACT

A method and apparatus for optimizing a non-ideal, real mode converter to substantially achieve the performance of an ideal mode converter. The method consists of optimizing the input linear polarization to the mode converter to balance the power in the principal modes of the mode converter at the output of the mode converter. This has the effect of maximizing the orthogonality of the output polarization states of the mode converter. The present invention also provides an electro-optical mode converter with means to adjust the orientation of the input polarization state to substantially balance the power in the principal modes at the output of the converter. In the case of an intensity modulator, the output polarization state can also be adjusted to maximize mode conversion and extinction ratio.

9 Claims, 11 Drawing Sheets

METHOD AND APPARATUS FOR ENHANCING THE EXTINCTION RATIO IN MODE CONVERTERS

FIELD OF THE INVENTION

The present invention relates generally to optical polarization mode converters. More particularly, the present invention relates to methods and apparatus for enhancing the extinction ratio in polarization mode converters.

BACKGROUND OF THE INVENTION

In the fields of integrated optical devices and electro-optical devices, polarization mode converters are known. These converters receive light polarized in a first mode and provide light at an output in a second polarization mode. Mode converters can be either active or passive. An example of an active mode converter is disclosed in U.S. Pat. No. 5,566,257 to Jaeger et al., which is incorporated herein by reference. As used herein, "mode converter" refers to a polarization mode converter.

Figure 1:
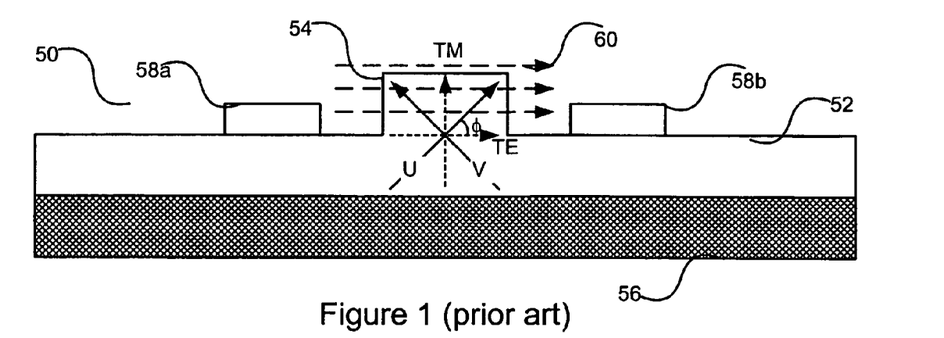
FIG. 1 is a cross-sectional view of a conventional electro-optical mode converter.

The basic function of an electro-optic mode converter can be described by extending the concept of principal optical axes for plane waves in birefringent media to optical waveguides. Light is confined in the optical waveguide in a small cross-sectional area, transverse to the direction of propagation. The mode converter is constructed to allow only the two fundamental optical modes to propagate. These modes are nearly identical in their optical intensity distribution, but differ in their polarization. FIG. 1 illustrates a conventional semiconductor optical mode converter 50. The electro-optical mode converter 50 typically includes an optical guiding layer 52, such as a III-V semiconductor or LiNbO$_3$-type material, formed on an electro-optical substrate 52. An optical waveguide 54 is defined on, or in, the substrate, and an electrode structure 58a, 58b is disposed in the vicinity of the optical waveguide.

The mode converter 50 is constructed to support two fundamental optical modes, one polarized predominantly along the U axis and the other predominantly polarized along the V axis. Light launched into either of these modes will propagate through the mode converter and maintain the optical power (excluding optical power loss) and polarization state. In an ideal mode converter, the principal axes, U and V, are oriented 45° from the chip axes, X and Y. Light launched into the waveguide polarized in either of the X or Y directions is resolved vectorially into equal amounts of U and V polarized components and propagates along the U and V axes of the waveguide. Light polarized in the X and Y directions is referred to as TE polarized and TM polarized, as is the convention with planar optical waveguides. Due to a phenomenon known as birefringence, where each of the principal axes has a different index of refraction, light in the U and V axes will travel at different phase velocities, leading to a "fast axis" and a "slow axis". Speed along either axis can be faster than the other depending on the construction of the mode converter. The degree of difference between the phase velocities of the fast and slow axes is called the modal birefringence of the mode converter. At the output of the waveguide, the light from each of the principal axes combines to form the output light.

In an ideal mode converter, equal powers are launched into the fast and slow axes of the waveguide. With the U and V axes oriented as in FIG. 1, TM polarized light 62, will resolve itself into equal powers in the fast and slow axes, as shown by arrows 62u and 62v in FIG. 2a. The polarization state at the output of the waveguide will be determined by the difference in the phase velocities of the fast and slow axes and the total length of the waveguide. An electric field can be applied to alter the polarization state, in other words, to obtain polarization modulation, by changing the difference in phase velocities. As a voltage is applied to the electrodes 58a, 58b, an electric field is formed across the optical waveguide, which can modify the optical properties of the waveguide material via the electro-optic effect, resulting in modified properties of the optical waveguide. The modified waveguide properties include the orientation of its principal axes and/or its birefringence, thus modifying the state of polarization of a light beam traversing the optical waveguide. In an ideal mode converter, the principal axes are rotated to 45° from an X-Y orientation, and the birefringence of the axes is adjusted so that the axes are either in phase or 180° out of phase with each other. This action of changing the phase velocities is known as switching the mode converter.

Figure 2A:
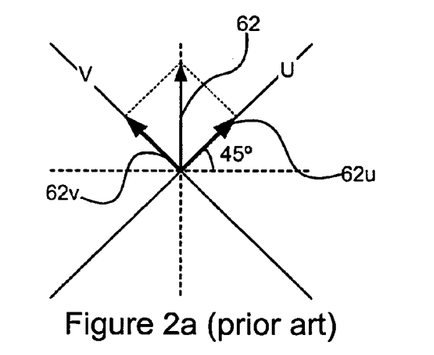
FIGS. 2a-2c are vector diagrams of an input state, and orthogonal output states of an ideal mode converter, respectively.
Figure 2B:
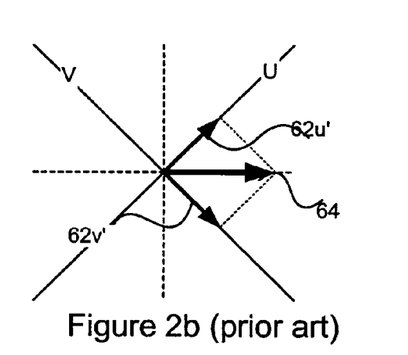
Figure 2C:
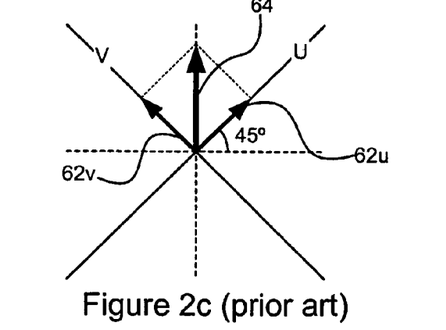

For example, when the difference in phase velocities is tuned to produce a 180° phase shift between the fast and slow modes at the waveguide output, light 62 launched with a linear polarization in the Y direction, as shown in FIG. 2a, will exit the waveguide as light 64 polarized in the X direction, as shown in FIG. 2b, where the constituent elements in the U and V axes are shown as arrows 62u' and 62v'. This action can be described as a power conversion from a TE polarization to TM polarization, or polarization modulation. In FIG. 2c, the converter has been tuned to produce a 0° phase shift. Thus, the light 64 at the output is polarized in the Y direction. As FIGS. 2a-2c show, by tuning the mode converter, two orthogonal output polarization states can be created. For linear polarizations, two states are orthogonal if their orientations are separated by 90°.

Unfortunately, actual mode converters do not behave in the ideal manner described above. Due to manufacturing tolerances, unstable material stresses and other non-idealities, a real mode converter will typically depart from the ideal behaviour: the orientation of the principal axes, U and V, may not be exactly at 45° to the chip axes, X and Y; the optical loss along each of the U and V axes may differ; the orientation of the U and V axes may vary along the length of the chip; the optical loss in each of the U and V axes may vary along the length of the chip; and, the orientation of the U and V axes may change with the electric field applied. Any manufactured mode converter will exhibit some combination of these non-ideal behaviours or others to some degree, depending on the design and manufacturing process variations. If a non-ideal mode converter is configured in the same way as described for the ideal mode converter, with an input linear polarization aligned with the X or Y chip axes, then as the mode converter is modulated, the output polarization will not sweep through orthogonal states. Orthogonal states are particularly desirable when using the mode converter as a polarization modulator or intensity modulator.

It is, therefore desirable to provide an electro-optical mode converter that is optimized to provide orthogonal outputs, preferably having maximized power.

SUMMARY OF THE INVENTION

It is an object of the present invention to obviate or mitigate at least one disadvantage of previous electro-optical mode converters. In particular, it is an object of the present invention to provide an electro-optical mode converter optimized to provide orthogonal output polarization states, and to provide a method of optimizing an electro-optical mode converter to provide orthogonal outputs polarization states. It is a further object of the present invention to provide an electro-optical intensity modulator, based on a mode converter, optimized to provide enhanced extinction ratio and enhanced mode conversion, and to provide a method of optimizing an electro-optic mode converter to provide enhanced extinction ratio and enhanced mode conversion.

In a first aspect, the present invention provides a method for optimizing optical performance of an electro-optic mode converter. The method comprises steps of adjusting an input polarization state of light, such as rotating a linear polarization state, launched into the mode converter; and monitoring an output polarization state of light emitted by the mode converter to determine an adjustment of the input polarization state to maximize one of orthogonality of output polarization states and optical power transmission at the output. The method can also further include adjusting an output polarization state of light emitted by the mode converter. Adjusting the output polarization state can include, for example, aligning a linear polarization axis of the output polarizing state to be substantially perpendicular to a linear output polarization state of the mode converter. When the mode converter is configured as an intensity modulator, the method can include determining an adjustment to the input polarization state and the output polarization state to maximize mode conversion, and/or extinction ratio, and to obtain a selected chirp value.

In a further aspect, the present invention provides an electro-optic mode converter apparatus. The apparatus comprises a waveguide formed in an optical guiding layer; a polarization element for controlling an input polarization state of light launched into the waveguide; and means for adjusting the input polarization state to maximize one of orthogonality of output polarization states and optical power transmission at the output. The adjustment means can include, for example, means for rotating a linear input polarization state. The polarization element can include, for example, a polarization-maintaining optical fiber, a polarizing optical fiber, a linear polarizer, or at least one optical wave plate. The apparatus can also include an output polarization state analyzer and means to adjust the output polarization state analyzer. The output polarization state analyzer can include, for example, a linear polarizer, a polarizing beam splitter, an optical wave plate, a polarization maintaining fiber, or a polarizing fiber.

In another aspect, the present invention provides an electro-optic intensity modulator. The modulator includes a waveguide, a polarization element and a means for adjusting the input polarization state. The waveguide is formed in an optical guiding layer. The polarization element is for controlling an input polarization state of light launched into the waveguide. The means for adjusting the input polarization state are for balancing power between output modes to provide optimal orthogonality of output polarization states and optical power transmission at the output.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein.

DETAILED DESCRIPTION

Generally, the present invention provides a method for optimizing a non-ideal, manufacturable mode converter to substantially achieve the performance of an ideal mode converter. The method consists of optimizing the input polarization state to the mode converter to balance the power in the principal modes of the mode converter at the output of the mode converter. This has the effect of maximizing the orthogonality of the output polarization states of the mode converter. The present invention also provides an electro-optical mode converter, which has means to adjust the orientation of the input polarization state to substantially balance the power in the principal modes, thus maximizing orthogonality, at the output of the converter.

Figure 3:
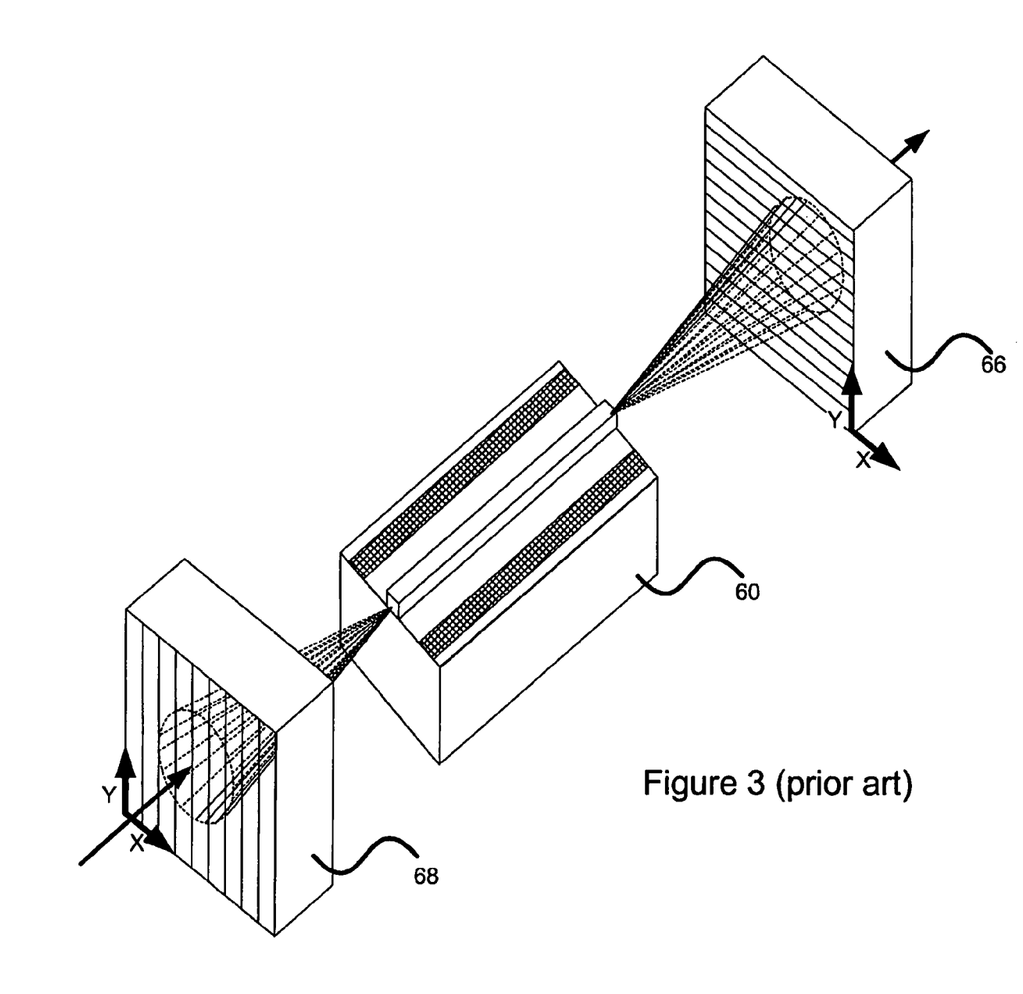
FIG. 3 is a perspective view of an ideal electro-optical mode converter configured as an intensity modulator.

Referring to FIG. 3, a polarization state analyzer, such as linear polarizer 66, is placed at the output of an ideal mode converter chip 60 and its polarization axis is aligned with the X axis. In the apparatus of FIG. 3, a polarization element, such as linear polarizer 68, placed at the input of mode converter chip 60 is also aligned to the Y axis of the mode converter chip 60 to ensure that light launched into the converter input is linearly polarized in the Y axis. In operation, the optical power, which passes through the polarizer 66 as the mode converter is modulated, will vary from 0% to 100% of the output optical power. This action is known as intensity modulation. However, no actual mode converter behaves in this ideal manner, due to non-orthogonal outputs in the desired output polarization states.

Figure 4A:
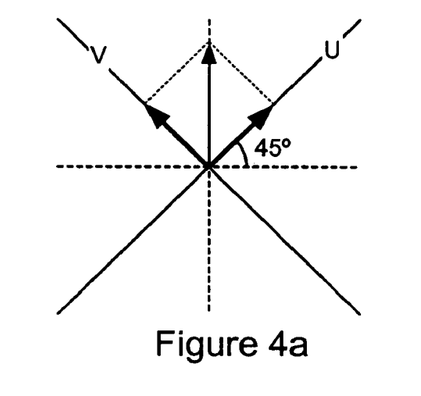
FIGS. 4a-4c are vector diagrams of an input state and output states for 0° and 180° phase shifts, respectively, for a first exemplary non-ideal electro-optical mode converter where there are unequal power losses along the U and V axes.
Figure 4B:
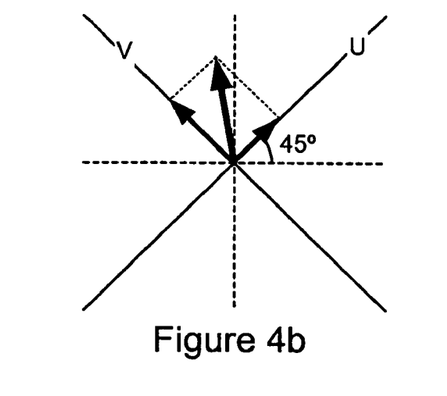
Figure 4C:
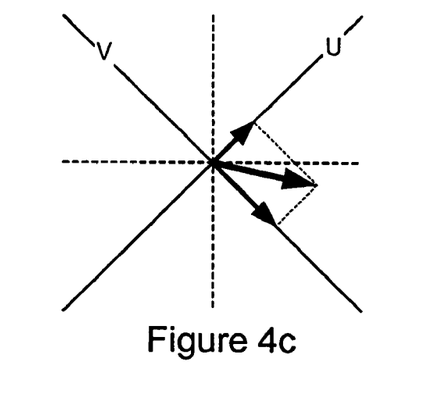

A first example of non-orthogonal output is shown in FIGS. 4a-4c. In this example, the mode converter exhibits different losses along the two principal axes, U and V. At the input, as shown in FIG. 4a, the principal axes U and V are oriented at 45° to the X and Y axes. The light is launched equally into the U and V polarized modes, as in the ideal mode converter. However, as the light passes through the mode converter, there is more optical power loss in the U polarized mode than in the V polarized mode, and, as shown by the shorter U vector at the output in FIGS. 4b and 4c, at the output of the mode converter there is less optical power in the U polarized mode due to the higher optical loss. FIGS. 4b and 4c show the resulting polarizations at the output of the mode converter when the U and V modes are in and out of phase. It is evident from these figures that these output polarization states are not orthogonal.

Figure 5A:
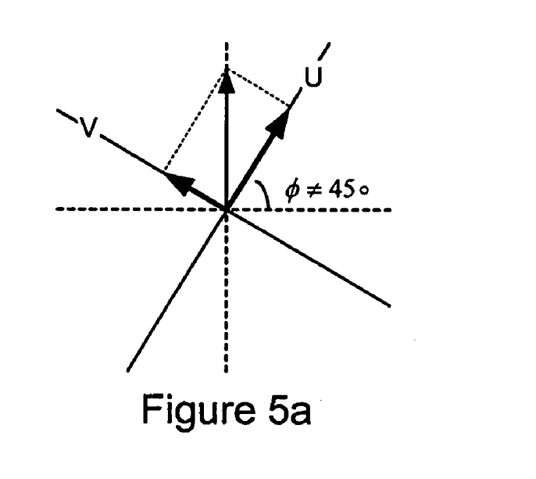
FIGS. 5a-5c are vector diagrams of an input state and output states for 0° and 180° phase shifts, respectively, for a second exemplary non-ideal electro-optical mode converter where the U and V axes are skewed.
Figure 5B:
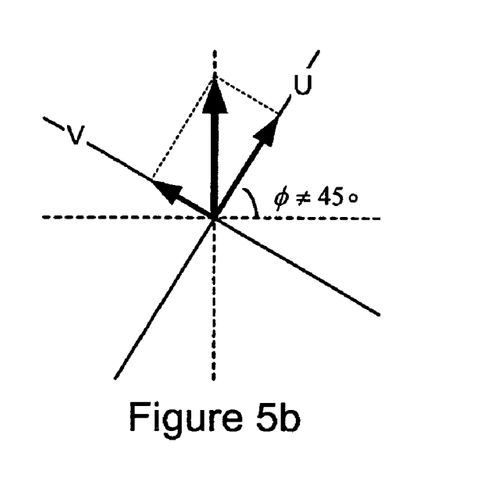
Figure 5C:
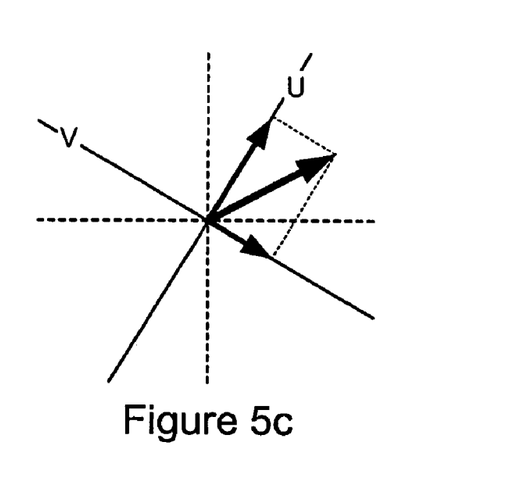

A second example of non-orthogonal output is shown in FIGS. 5a-5c. In this example the principal axes of the mode converter are not exactly at 45° to the X and Y axes. Light is launched into the mode converter with an input polarization set in the Y direction. This leads to unequal powers in the U and V polarized modes as shown in FIG. 5a. The corresponding output polarization states, with the U and V modes in and out of phase, respectively, are shown in FIGS. 5b and 5c, and are, again, not orthogonal.

In the case of intensity modulation, if two orthogonal states are not achieved at the output of the mode converter, the power exiting the intensity modulator will not vary from 0% to 100% of the optimum output power. This is demonstrated in FIGS. 6a-6c, where three cases of intensity modulation versus electric field are shown for a mode converter with non-orthogonal output states. The non-orthogonal transfer states 70a, 70b and 70c are compared to an ideal mode converter transfer function 72.

Figure 6A:
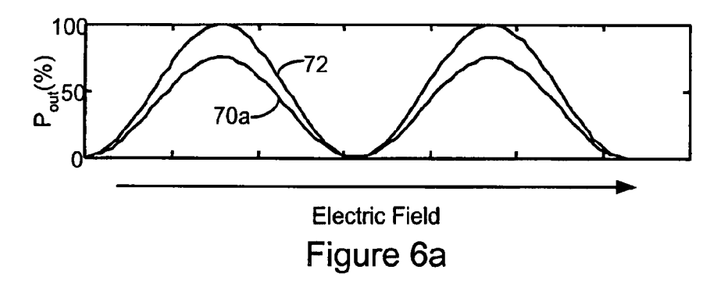
FIGS. 6a-6c are graphs of percent output power versus electric field for non-orthogonal outputs in an intensity modulator.
Figure 6B:
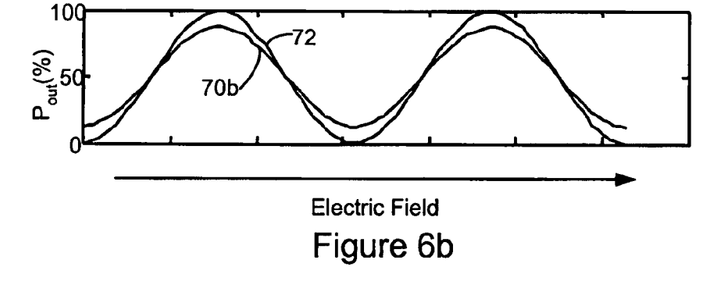
Figure 6C:
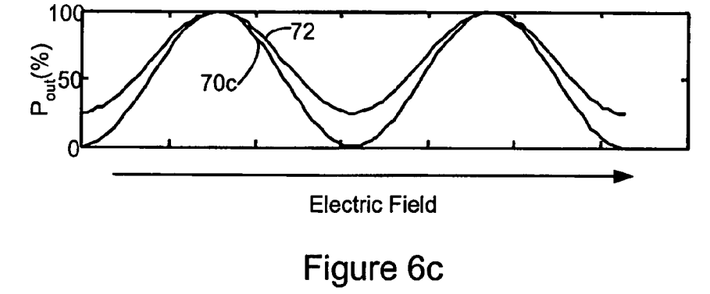

None of the cases shown in FIGS. 6a-6c are optimal configurations for intensity modulators since it is desirable to have the largest possible contrast between the maximum and minimum output optical powers, while maintaining the maximum possible output power in the "on" state (typically one of the in or out of phase output polarization states). Usually this contrast is quantified by two parameters, the extinction ratio, which is the ratio of the minimum and maximum powers (Pmin/Pmax) usually expressed in decibels (dB) and the mode conversion, which is the difference between Pmin and Pmax. In the case depicted in FIG. 6a, there is a large extinction ratio, however, the mode conversion is less than 100% of the output power since not all of the power is able to pass through the output polarizer. In the case of FIG. 6c, no power is lost in the "on" state, however, the extinction ratio is low. In the case of FIG. 6b, there is both power lost in the "on" state and a low extinction ratio. In an optimized mode converter configured as an intensity modulator, it is desirable to have a high extinction ratio and maximum mode conversion.

Figure 7:
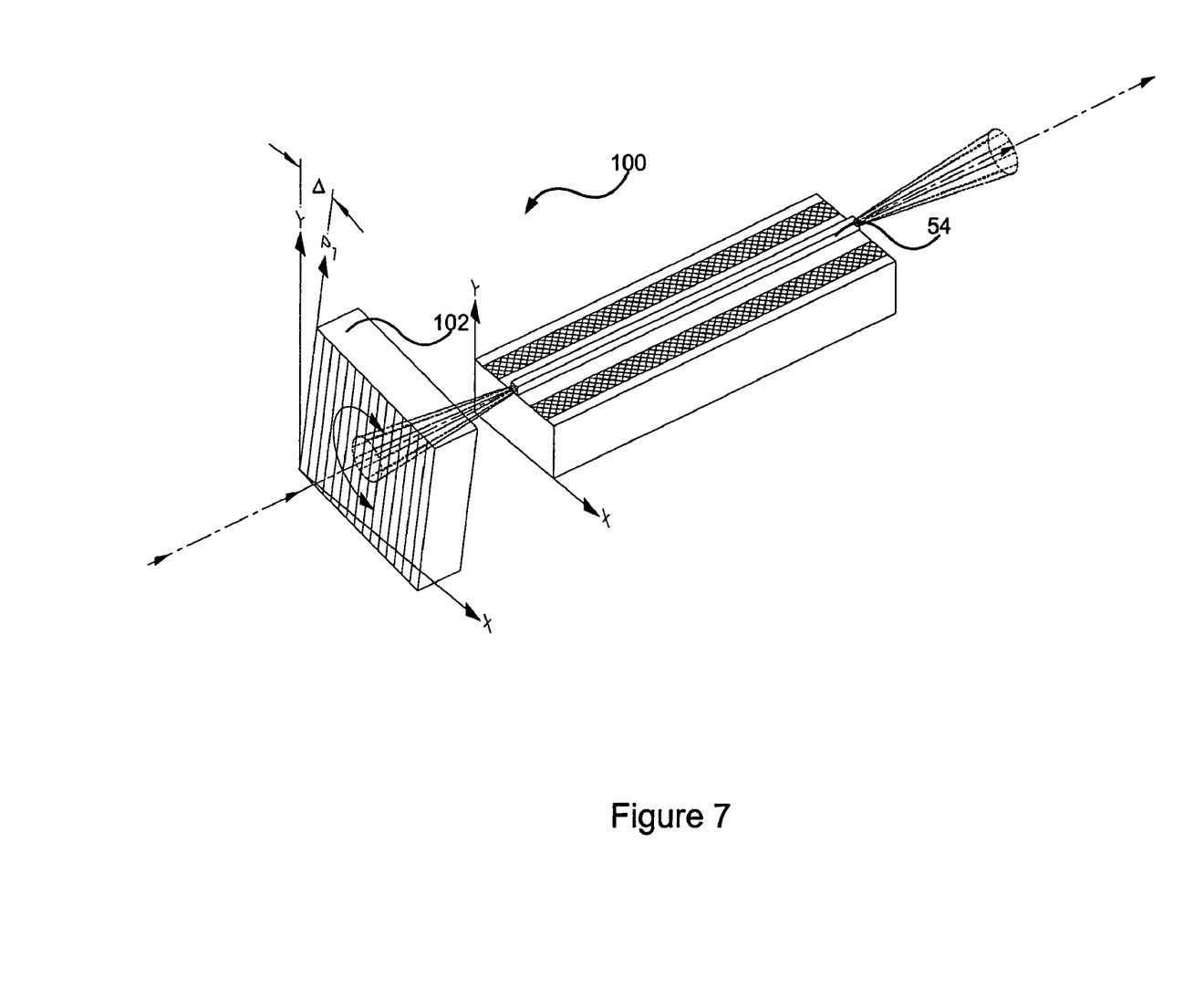
FIG. 7 is a perspective view of a mode converter according to the present invention with an adjustable polarizer at the input.

According to a method of the present invention, a mode converter with non-orthogonal outputs can be made to exhibit substantially ideal behaviour by adjusting the input polarization state to enhance the orthogonality of the output polarization states at the output of the converter. Referring to the FIG. 7, an embodiment of a mode converter apparatus 100 having a polarization element and means to adjust the input polarization at the input to the waveguide 54, such as adjustable input polarizer 102, is shown. As the input polarizer 102 is rotated, the power in the each of the principal modes at the output will change. The optimal orientation is found by monitoring the orthogonality of the polarization states of the light emitted by the mode converter, while the mode converter is modulating. In other words, at some rotation angle Δ (to the vertical Y axis), the power in the output modes will be equalized, at which point, the output polarization states will be orthogonal, or substantially so. The orthogonality of the polarization states at the output can be measured with a commercial polarimeter or by temporarily placing a linear polarizer at the output of the device and measuring intensity modulation. In the latter case, the maximum orthogonality in the output states is achieved when the linear polarizer at the output can be oriented such that the transmitted power varies from 0% to 100% of the output power of the mode converter.

Figure 8:
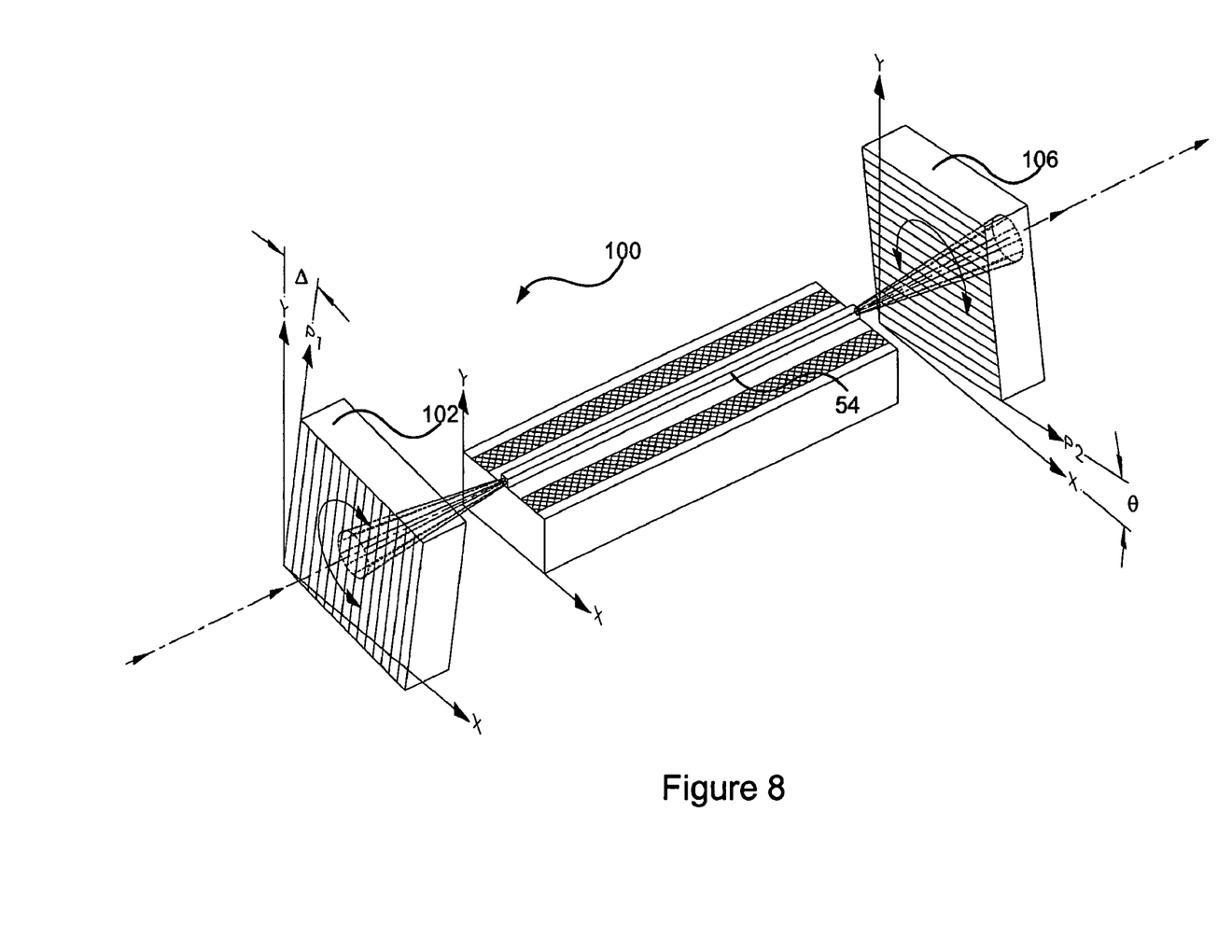
FIG. 8 is a perspective view of a mode converter according to the present invention with adjustable polarizers at the input and output.

An embodiment of a mode converter configured as an intensity modulator 104 according to the present invention is shown in FIG. 8. Again, an adjustable input polarizer 102 is placed at the input to the waveguide 54 to permit the power in the principal modes to be balanced at the output. Additionally, an adjustable output polarization state analyzer, such as adjustable output polarizer 106, is placed at the output of the waveguide 54. One skilled in the art will appreciate that adjusting to maximize the orthogonality of polarization states and adjusting to maximize the optical power transmission, may not be achievable at the same time. A compromise must be made in such cases to select the highest coinciding values for the orthogonality and optical power transmission. The term maximizing should be understood to describe not only the strict term of obtaining the highest value possible, but also obtaining the highest possible coincident values.

For a mode converter configured as an intensity modulator, the input polarizer 102 is initially aligned with the Y axis of the chip and the output polarizer 106 is aligned with the X axis of the chip. The output polarizer 106 and input polarizer 102 are collectively rotated by the same angle, θ=−Δ with respect to the waveguide 54 to optimize the output power in the "on" state of the modulator. Next, the angle of the output polarizer 106 only is rotated to maximize the extinction ratio of the output. The procedure of a collective rotation of the input polarizer angle Δ and output polarizer angle θ followed by an independent rotation of the output polarizer angle θ is repeated two or three times. After these iterations, the peak output power and extinction ratio converge on their maximum values. In this way, the extinction ratio and mode conversion of a non-ideal mode converter can be made substantially the same as that of an ideal mode converter. There are many variations of this procedure that yield the same result but may differ in the number of iterations required to converge on the final result. For example it is possible to change the order in which the polarizers are optimized.

In the preceding example, the initial orientation of the input polarization was chosen to be aligned with the Y axis and the initial orientation of the output polarizer was chosen to be aligned with the X axis. These particular starting points are not required and other initial orientations of the polarizers will work. These values are chosen since they ensure the most rapid convergence of the peak output power and extinction ratio for a mode converter that is nearly ideal. It is equally efficient to initially align the input polarization with the X axis and the output polarizer with the Y axis.

In the case of an intensity modulator, the optimal configuration of the input polarization angle and output polarizer angle does not always lead to perfect orthogonality at the output. For example, in the case of a mode converter with skewed principal axes, the optimization for the intensity modulator will lead to orthogonal polarization states at the output of the mode converter. As a second example, optimization of a mode converter with differential loss for the two principal axes will lead to output states which are not perfectly orthogonal; however, the optimization will nonetheless maximize the peak optical power and extinction ratio.

Figure 9A:
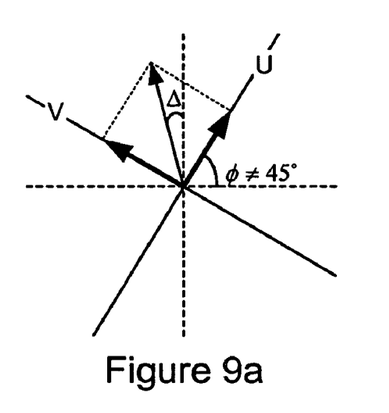
FIGS. 9a-9c are vector diagrams of an input state and output states for 0° and 180° phase shifts, respectively, of a mode converter optimized according to the present invention.
Figure 9B:
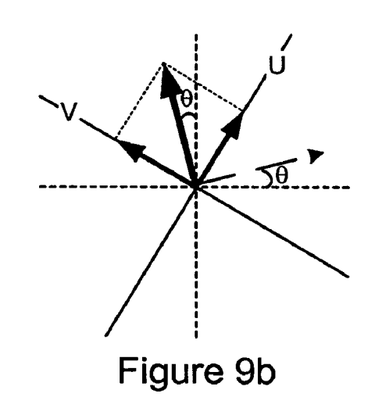
Figure 9C:
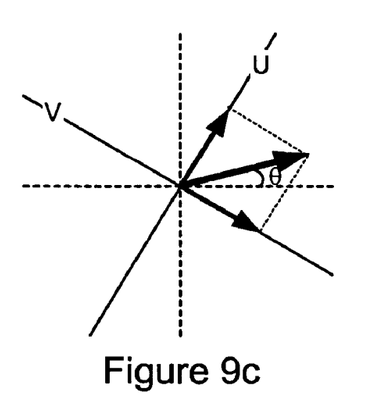

An example of how this method works for a non-ideal mode converter is shown in FIGS. 9a-9c. In this example, the principal U and V axes of the mode converter are not aligned to 45° to the X and Y axes. The input polarization is optimized such that the power in the U and V modes at the output of the mode converter is equal, as shown in FIGS. 9b and 9c for the two output polarization states. In this particular example, the input polarization is rotated from the Y direction by an angle Δ. The two resulting orthogonal output polarizations, shown in FIGS. 9b and 9c, are, therefore, not aligned with the X or Y axes of the mode converter. As a result, the output polarization must be adjusted by an angle θ to provide high mode conversion and extinction ratio.

It should be emphasized that, while the preceding examples have described the optimization and adjustment of linear polarized light beams, the invention is equally applicable to mode converters that operate in any polarization states, such as converters that use circularly or elliptically polarized light. It should also be emphasized that the invention works with any means to adjust or tweak input and output polarization states, and is not limited to mechanical rotation of polarizers. Optical elements such as quarter wave plates, half wave plates, Faraday rotators, or polarization maintaining fibers can be employed to adjust the polarization state at the input or output.

While the preceding examples have described a method to optimize the orthogonality between polarization states at the output of a mode converter, the same technique can be applied to set the angle between linear output polarization states to any other desired value by controlling the relative amounts of power in the U and V modes at the output of the device.

The examples presented thus far show that the extinction ratio optimization works for non-ideal mode converters that have constant properties along the length of the waveguide, or are length invariant. This same optimization technique can also be used to improve the performance of mode converters which are not length invariant, that is to say the properties of the principal modes (loss and orientation) change along the length of the mode converter. This method may also be applied to mode converters whose properties vary as a function of the electric field strength. In these cases it may not be possible to achieve the performance of an ideal mode converter; however, in practical situations the performance can be made substantially the same as an ideal mode converter.

Figures 10A, 10B:
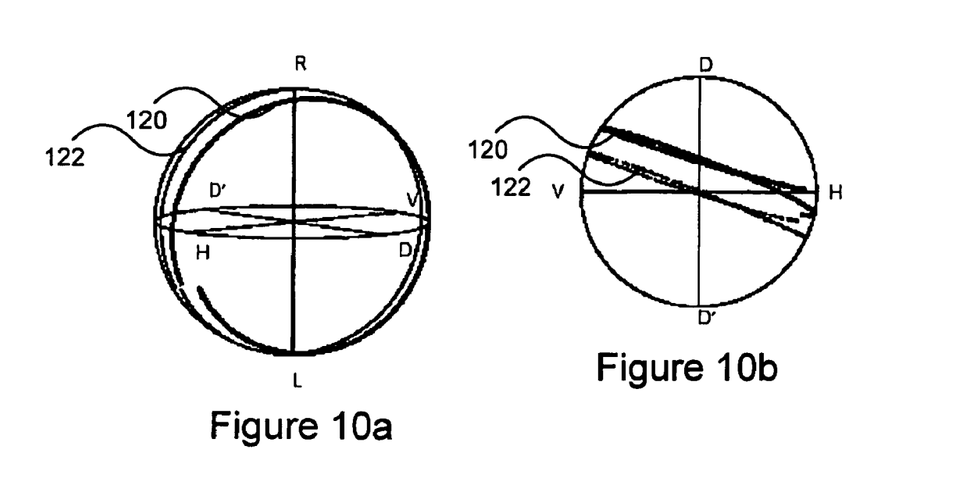
FIGS. 10a-10d are Stokes vector diagrams showing the output polarization of mode converters without optimization according to the present invention, and with such optimization.
Figure 10C:
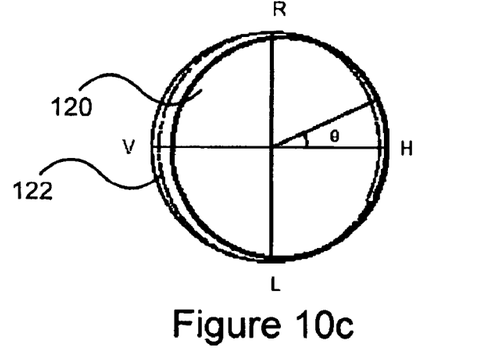
Figure 10D:
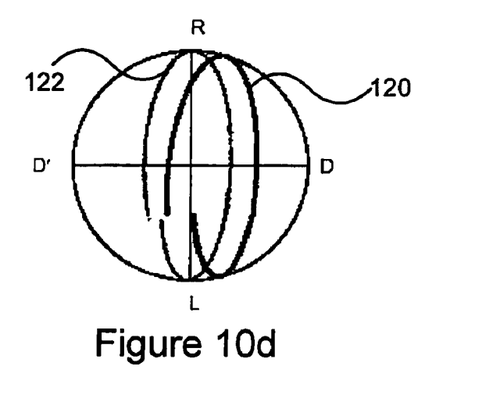

FIGS. 10a-10d are Stokes vector diagrams showing the output polarization state of a mode converter chip without optimization 120, and with optimization 122. FIG. 10a is a perspective view of the 3-D Stokes vectors. FIGS. 10b, 10c and 10d are projections of the Stokes data into the S3, S2 and S1 normal planes, respectively. This data shows the improvement in orthogonality between output states of the mode converter chip when the device is optimized according to the present invention. With Stokes vectors, two polarization states are orthogonal when they are co-linear but opposite in direction. In the case of an ideal mode converter, the output states trace out a circle centered on the origin. In this case, every output state has a perfectly orthogonal counterpart 180° around the circle. In an un-optimized mode converter, the output states tend to trace out a circle 120 which is not centered on the origin, as shown in this figure. In this case states can not be orthogonal. The circle 122 for the optimized mode converter shows that the output states trace out a very nearly maximal diameter circular path centered on the origin.

Figure 11:
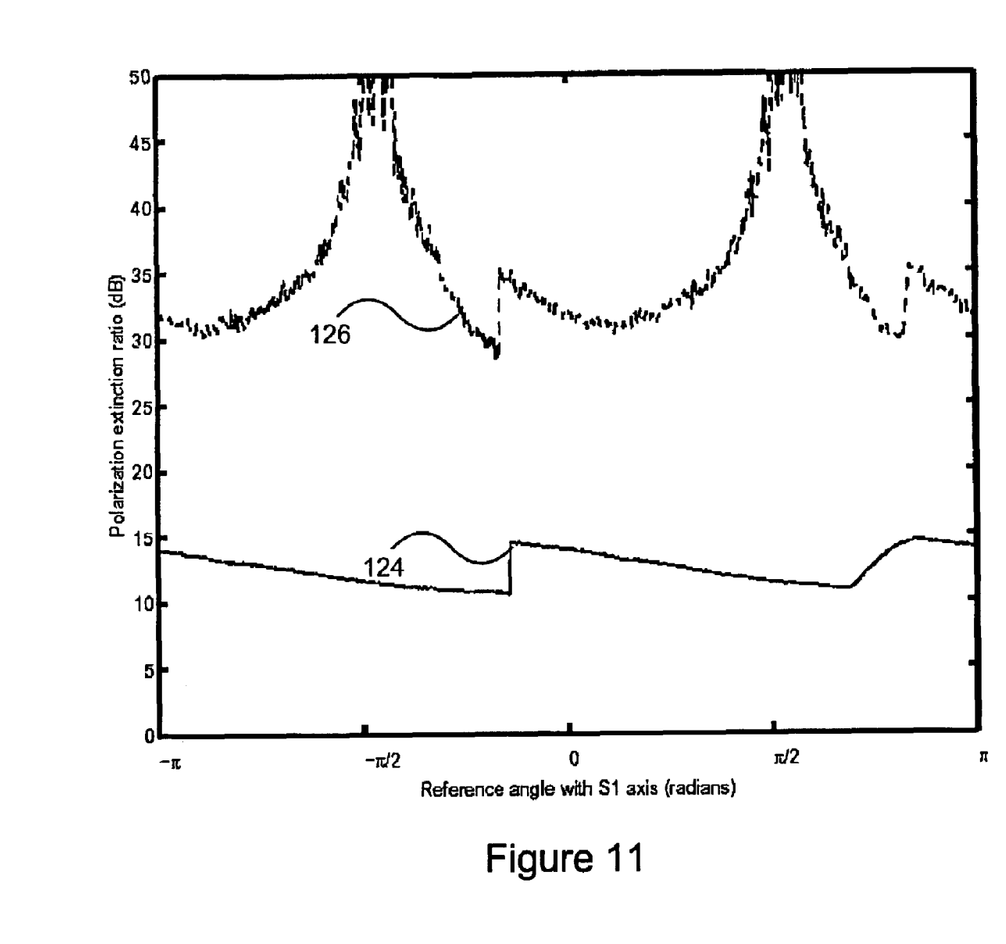
FIG. 11 is a plot of polarization extinction ratio versus reference angle for a mode converter with and without optimization according to the present invention.

FIG. 11 shows plots of polarization extinction ratio data for un-optimized 124 and optimized 126 mode converters. For each output state of the mode converter, the most orthogonal output state is identified and the orthogonality is expressed as a polarization extinction ratio. The output states are identified on the x axis by the angle the Stokes vector makes with the S1 axis. The polarization extinction ratio is a measure of orthogonality between two output states, expressed on a log scale. For perfectly orthogonal states, the polarization extinction ratio is infinite. The orthogonality is calculated at each input Stokes vector, $d_1$, according to $$ER = -10\log\left(\frac{1 + d_1 \cdot d_2}{2}\right)$$

where $d_2$ is the output state Stokes vector that minimizes the dot product with $d_1$.

Figure 12A:
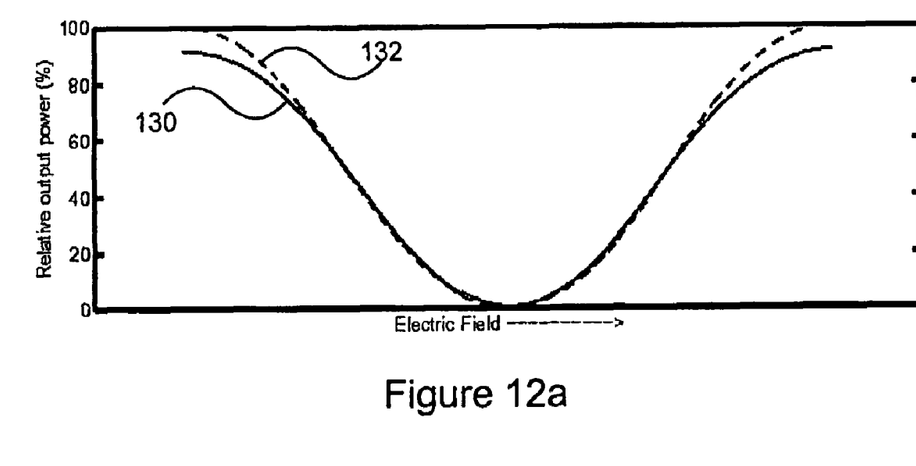
FIGS. 12a and 12b are plots of output optical power as a function of applied electric field on linear and log scales, respectively, for a mode converter according to the present invention configured as an amplitude modulator.
Figure 12B:
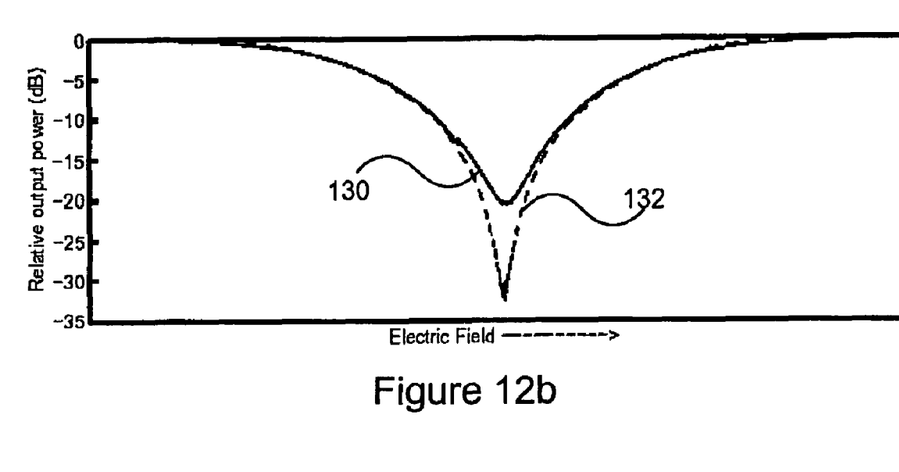

FIGS. 12a and 12b show output optical power as a function of applied electric field for mode converters which have been configured as amplitude modulators. The solid line 130 represents an un-optimized mode converter, whereas the dashed line 132 represents an optimized mode converter. FIG. 12a shows the data on a linear scale, whereas FIG. 12b shows the same data on a log scale. Comparison of the data shows that the optimized mode converter exhibits a lower optical power loss and a better extinction ratio than the un-optimized mode converter.

Lastly, it should be noted that there is an intimate relationship between the extinction of the mode converter and its "chirp." Chirp refers to a frequency deviation of the optical carrier in response to a rapid change of state of the modulator, also known as transient chirp. The methods disclosed here to enhance extinction ratio also serve to allow the selection of a desired chirp. Typically, the configuration of minimum chirp is substantially the same as with the configuration of maximum extinction ratio. In cases where chirp is of paramount concern, chirp can be monitored while adjusting the input polarization state, and output polarization analyzer to achieve minimum chirp or a selected chirp, such as a chirp near zero.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for optimizing optical performance of a single waveguide electro-optic polarization mode converter apparatus, comprising steps of:
    launching light into the single waveguide electro-optic polarization mode converter apparatus;
    adjusting an input polarization state of light launched into the single waveguide electro-optic polarization mode converter apparatus; and
    monitoring an output polarization state of light emitted by the single waveguide electro-optic polarization mode converter apparatus to determine an adjustment of the input polarization state to substantially maximize one of orthogonality of output polarization states and optical power transmission.

2. The method of claim 1, wherein adjusting the input polarization state includes rotating a linear polarization state.

3. The method of claim 1, including further adjusting an output polarization state.

4. The method of claim 3, wherein adjusting the output polarization state includes rotating an output linear polarization state.

5. The method of claim 4, further including aligning a linear polarization axis of the output polarization state to be substantially perpendicular to a linear output polarization state of the polarization mode converter.

6. The method of claim 3, further including determining an adjustment to the input polarization state and the output polarization state to maximize polarization mode conversion.

7. The method of claim 3, further including determining an adjustment to the input polarization state and the output polarization state to maximize extinction ratio.

8. The method of claim 3, further including determining an adjustment to the input polarization state and the output polarization state to maximize polarization mode conversion and extinction ratio.

9. The method of claim 3, further including determining an adjustment to the input polarization state and the output polarization state to obtain a selected chirp.

* * * * *